United States Patent [19]

Jeffries

[11] 4,255,360

[45] Mar. 10, 1981

[54] WATER AERATOR AND METHOD

[76] Inventor: Kerry P. Jeffries, 5611 Knobby Knoll, Houston, Tex. 77092

[21] Appl. No.: 69,856

[22] Filed: Aug. 27, 1979

[51] Int. Cl.³ .............................................. B01F 3/04
[52] U.S. Cl. .................... 261/5; 261/119 R; 261/121 M; 261/36 R; 261/DIG. 75; 261/DIG. 79; 415/206
[58] Field of Search .................. 261/5, 119 R, 121 M, 261/36 R, DIG. 75, DIG. 79; 415/121 R, 121 G, 203, 204, 206, 219 C; 210/15, 220

[56] References Cited

U.S. PATENT DOCUMENTS

| 950,999 | 3/1910 | Erlwein | 261/DIG. 75 |
|---|---|---|---|
| 1,734,011 | 10/1929 | Harrison | 261/DIG. 75 |
| 1,987,501 | 1/1935 | Andrews | 261/119 R |
| 2,128,311 | 8/1938 | Mertes | 261/DIG. 75 |

FOREIGN PATENT DOCUMENTS 308254  6/1930  United Kingdom ............ 261/DIG. 75

Primary Examiner—Ernest G. Therkorn

[57] ABSTRACT

A live bait water aerator comprises a submergible water pump, a conduit attached to the water outlet of the pump, leading vertically upward above the water surface, ending in a water delivery head having a plurality of delivery holes set at an angle relative to the surface of the water. A method of aerating water in a live bait container which comprises drawing water through a three-chambered submergible electrically powered water pump, passing the water through a conduit ending above the surface of the water, delivering a plurality of streams of water through a cylindrical delivery head onto and below the surface of the water in which the pump is submerged thereby trapping air bubbles below the surface of the water.

38 Claims, 6 Drawing Figures

WATER AERATOR AND METHOD

BACKGROUND OF THE INVENTION

There are generally two types of water aerators which are used, for among other things, to keep fishing bait alive. One type of aerator draws air from the surrounding air and pumps the air in a stream of bubbles beneath the surface of the water. The other type agitates the surface of the water so as to draw or trap air bubbles beneath the surface of the water. Among the latter types are those which force streams of water onto and below the surface of the water, thereby trapping air bubbles and forcing the air/water mixture to circulate within the container. The present invention is a live-bait water aerator suitable for placing in any container to provide uniform aeration. The present invention is a three-chambered water pump which rests on the bottom of a container and pumps filtered water from the container above the surface of the water in the container and sends streams of water in a substantially circular pattern, below the surface of the water, thereby driving air, containing oxygen, below the surface and simultaneously setting up a circulation of water containing air bubbles within the bait container thereby prolonging the life of the bait.

SUMMARY OF THE INVENTION

The invention relates to a water aerator which supplies oxygen to water by trapping air in streams of water driven below the surface of the water while simultaneously circulating the water. The invention relates to a water pump which circulates water, driving a plurality of streams of water through air onto and below the surface of the water in which the pump is submerged, in a substantially circular pattern. The invention further relates to a live bait water aerator having an electrically driven water pump, and having means for attaching the pump to the bottom of the container of water in which the water pump is submerged.

The water pump of this invention is a three-chambered container with an electrically driven motor, within a housing forming the top of the container, the electrically driven motor having a shaft with an impeller attached to the shaft, the shaft and the impeller extending into a first chamber which is in contact with a second chamber by means of at least one fluid passage and a third chamber at least surrounding the second chamber and communicating with the second chamber through at least one fluid passage and with the surrounding water by at least one fluid passage, the third chamber being filled with a filter material. The first chamber has a hole in its side with a conduit attached to the side of the first chamber surrounding the hole, the conduit leading vertically upward above the surface of the water into a delivery head. The invention relates to an aerator with a substantially cylindrical delivery head having a plurality of delivery holes substantially evenly placed about the sides of the cylindrical head where the holes are drilled within the cylindrical side of the delivery head at an angle relative to a line perpendicular to the surface of the water in the container and through the center of the cylindrical head of between about 35 and about 50 degrees. The invention relates to a live bait water aerator which pumps water taken in from the container in which it is submerged, up above the surface of the water and into the water in a plurality of streams in a substantially circular pattern down below the surface of the water forcing air in the form of bubbles to about 7.5 centimeters below the surface of the water.

DESCRIPTION OF THE PREFERRED EMBODIMENTS

The water aerator will be described further by reference to the Figures.

Figure 1:
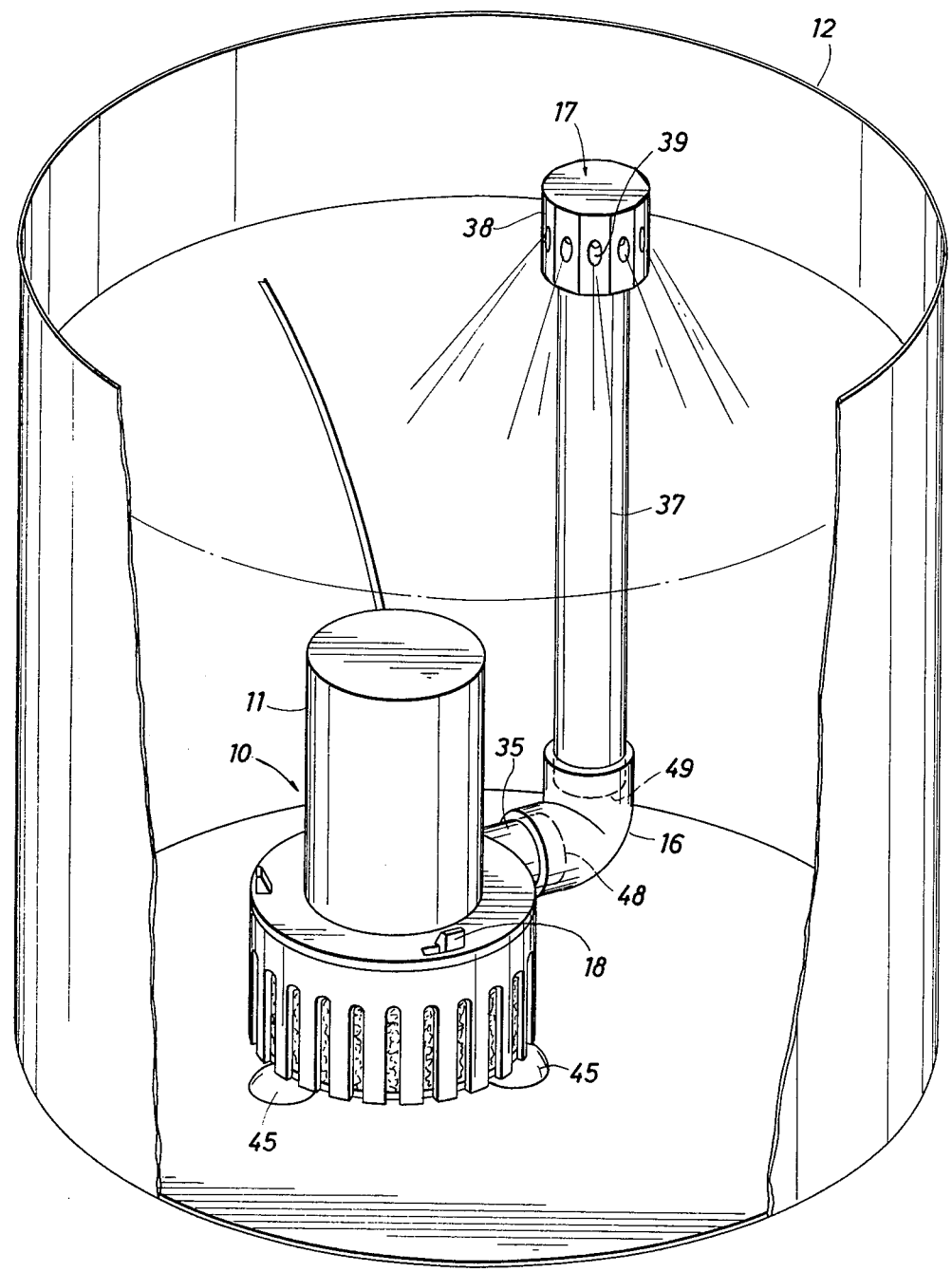
FIG. 1 is a view of the aerator from the side slightly above horizontal with a container which is partially cut away.
Figure 2:
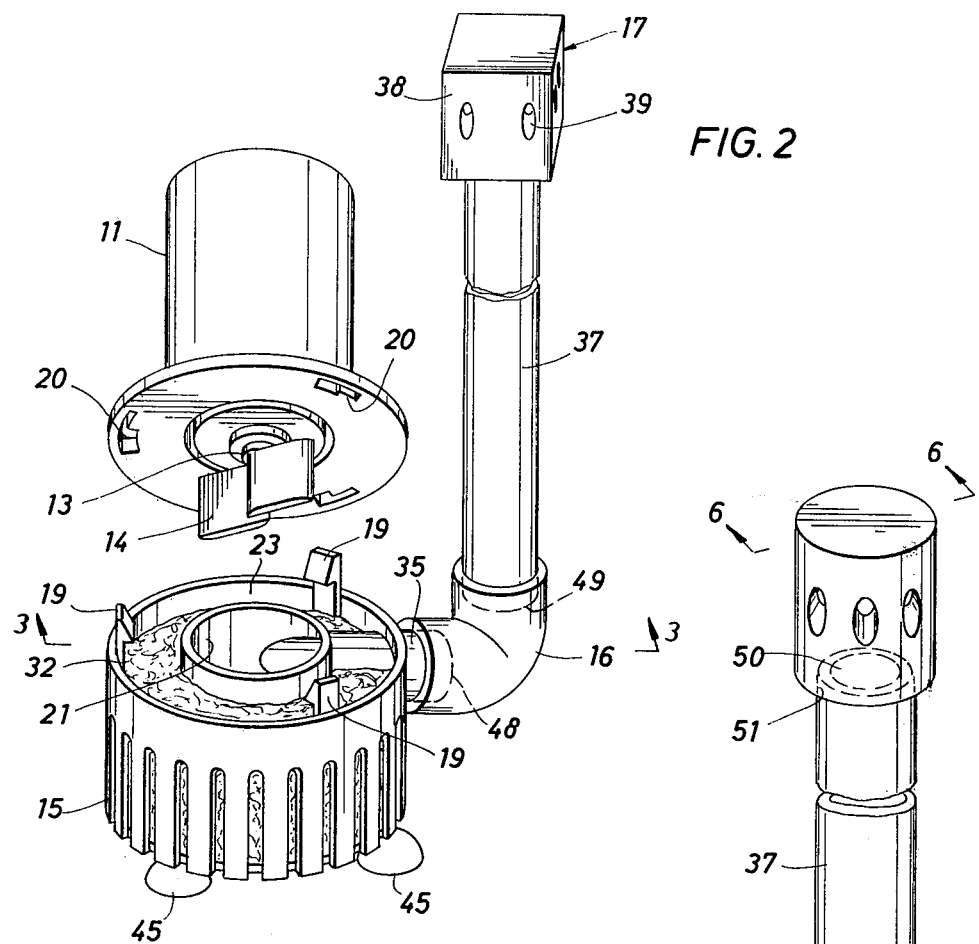
FIG. 2 is a view of the aerator from a position slightly above the aerator with the top motor housing separated from the three-chambered housing.

FIGS. 1 and 2 show the live bait water aerator 10 with an electrical motor housing 11 containing an electrical motor (not shown) which can be powered by batteries or a battery or a conventional alternating current source but preferably by batteries and most preferably by a 12-volt battery. The motor is sealed within the housing 11 so that water cannot touch the motor since almost all of the aerator is submerged in water within a container such as 12. The aerator 10 consists of an electric motor within the housing 11 which turns a shaft 13 with an impeller 14 within a three-chambered or three-compartmentalized housing 15. The rotating impeller 14 draws water into the multi-chambered housing 15 and through a delivery conduit 16, into a discharge head 17 where the water is discharged in a plurality of streams onto and beneath the surface of the water carrying air bubbles between about 5 and about 9, preferably between about 6 and about 7.5 centimeters below the surface. The motor housing 11 forms the top of the multi-chambered housing 15 and is reversible attached thereto by fastening means 18, preferably a hook 19 and eye 20 type fastening means.

Figure 3:
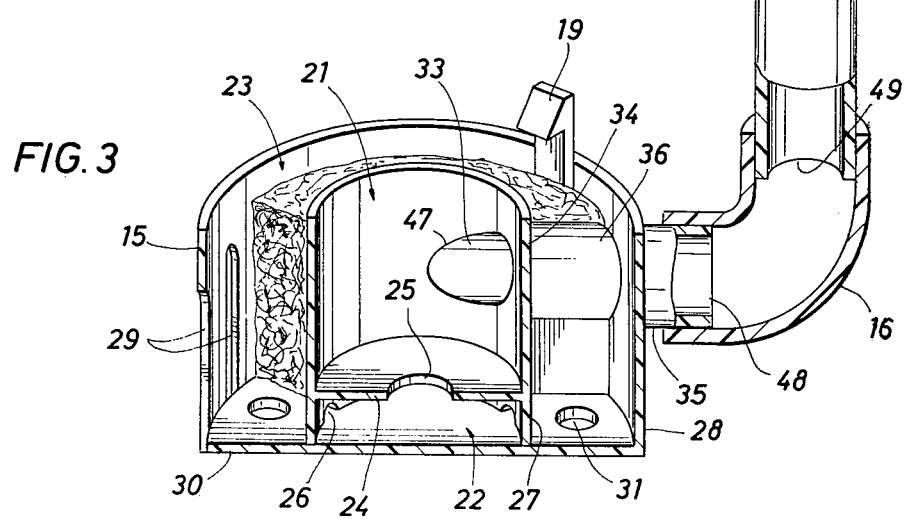
FIG. 3 is a view of the three-chambered housing cut vertically along the line 3—3' of FIG. 2.

FIGS. 2 and 3 show the inside of the multi-chambered or multi-compartmental housing 15 which consists of three chambers or compartments, an inner upper chamber or compartment 21, an inner lower chamber or compartment 22 and an outer chamber or compartment 23. The inner upper chamber 21 is over the inner lower chamber 22, the bottom 24 of the inner upper chamber 21 forming the top 24 of the inner lower chamber 22 and serving as a partition 24 between the inner upper and lower chambers 21 and 22. At least one partition hole or fluid passage 25, is in the partition 24 and allows fluid communication between the inner upper chamber 21 and inner lower chambers 22. The preferred number of partition holes is 1 to 5 inclusive; the most preferred is 1. The inner chambers 21 and 22 are surrounded by the outer chamber 23. At least one hole or fluid passage 26 exits in the side or sides 27 of the lower chamber 22 which allows fluid communication between the outer chamber 23 and the inner lower chamber 22. The preferred number of inner lower chamber side passages is between about 1 and about 12, most preferably between about 2 and about 7. The outer chamber's outer wall 28 has at least one, preferably between about 1 and about 30, most preferably between about 1 and about 20 holes or fluid passages 29 allowing fluid communication between water outside of the aerator 10 and the outer chamber 23. The bottom of outer chamber 23 has at least 1, preferably between about 1 and about 15, most preferably between about 1 and about 12 holes, openings or fluid passages 31 which also allow fluid communication between water outside of the aerator 10 and the outer chamber 23. The shape of chambers 21, 22 and 23 may be essentially polyhedral or cylindrical but the preferred shape is cylindrical, the inner chambers 21 and 22 having essentially equal horizontal diameters, preferably between about 2.5 and about 7.5 centimeters, most preferably between about 3 and about 5 centimeters with the outer chamber 23 also preferably being cylindrical and concentrically surrounding the inner chambers 21 and 22 with a horizontal diameter between about 3.5 and about 12.5 preferably between about 6.5 and 8.5 centimeters. The height of the three-chambered housing is between about 2 and about 8, preferably between about 3 and about 5 centimeters.

The outer chamber 23 is filled with a filter material 32 so that water which enters the outer chamber 23 through the outer chamber side holes 29 and the outer chamber bottom holes 31 passes through the filter material 32 then through the inner lower chamber side holes 26 into the inner lower chamber 22. The filter material 32 may be any material which filters but does not build excess pressure so as to burn out the pump motor. Preferred materials for the filter 32 are open pored or celled non-woven webs, most preferably open pored non-woven plastic webs made of polypropylene, polyethylene, polyvinylchloride, polystyrene, or nylon.

The inner upper chamber 21 has at least one side opening 33 which passes through the side 34 of the inner upper chamber 21. Securely attached to the side 34 and surrounding the side opening 33 is the pump water outlet conduit 35 having an entrance opening 47 communicating with the side opening 33. The outlet conduit 35 passes through the outer chamber 23, through a hole or opening 36 in the side 28 of the outer chamber 23, the outlet conduit 35 also having a water exit hole 48 or opening with a fluid passage connecting holes 47 and 48 so that water can flow from within the inner upper chamber 21 outside the pump.

The exit hole or opening 48 of the outlet conduit 35 is connected to the entrance hole or opening 49 of delivery conduit 37 preferably through a right angle elbow 16. The delivery conduit having an exit hole or opening 50 at the other end with a fluid passage connecting the delivery entrance 49 and exit 50. The delivery conduit 37 extends vertically to a height of between about 20 and about 40, preferably between about 20 and about 30 centimeters above the bottom of the aerator 10. In a preferred embodiment, the height is adjustable, for example it can be telescopic in nature as in FIG. 2.

The outlet conduit 35 is attached to the side 34 of the inner upper chamber 21 so that a line through the horizontal center of the conduit 35 and into the inner chamber 21 does not pass through the vertical center of the inner upper chamber 21 and forms a cord with the circle made by the outer edges of the rotating impeller blades 14. The outlet conduit 35 and delivery conduit 37 serves to pass water from the pump to the delivery head 17.

Figure 6:
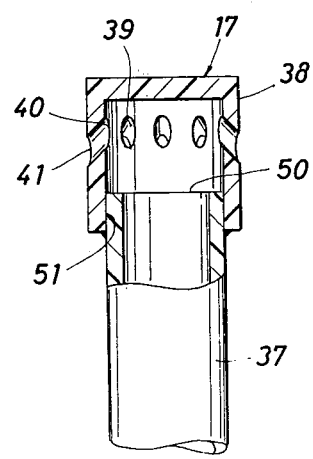
FIG. 6 is a view of the delivery head and part of the vertical conduit cut vertically along the line 6—6' in FIG. 3.

The water delivery head 17 having a bottom hole or opening 51 is securely and sealingly connected to the delivery conduit 37 so that the delivery conduit exit 50 is in open communication with the bottom opening 51. The vertical sides of the head may form the shape of a polygon, preferably a regular polygon of greater than five (5) sides or a cylinder. A cylindrically shaped head 17 is the most peferred as shown in FIG. 3. The head 17 is preferably between about 1.5 and about 5.0 centimeters in height and has a maximum cross-section width of less than about 5 centimeters and a minimum cross-section width of greater than about 2, preferably less than about 3.5 and greater than about 2.5 centimeters. Passing through the vertical side or sides of the head 17 are a plurality of holes or openings 39 with an entrance 40, seen in FIG. 6, which is higher than the exit 41 so that a line through the center of the length of the hole 39 forms an angle with a vertical line through the cross-sectional center of the hole 39 of between about 30 degrees and about 55 degrees, preferably between about 37.5 degrees and about 47.5 degrees and most preferably between about 38 degrees and about 42 degrees. The preferred angle is 40 degrees.

The diameter of the holes, openings or passages 39 is between about 0.25 and 0.40 centimeters, preferably between about 0.27 and about 0.33 centimeters. The length of the hole 39, measured from the entrance 40 to the exit 41 is between about 0.35 and about 0.55, preferably between about 0.40 and about 0.50 centimeters, most preferably between about 0.42 and about 0.48 centimeters long. The preferred length is 0.46 centimeters.

The side holes 39 are substantially evenly spaced over the side of the head. The holes 39 are preferably placed in a single horizontal plane about the circumferance 38 of the delivery or water discharge head 17 so as to produce a single circular pattern of streams of water, but can be placed on more than one horizontal plane (FIG. 1) to produce a series of circles or evenly spaced patterns of streams of water on the surface of the water.

Figure 4:
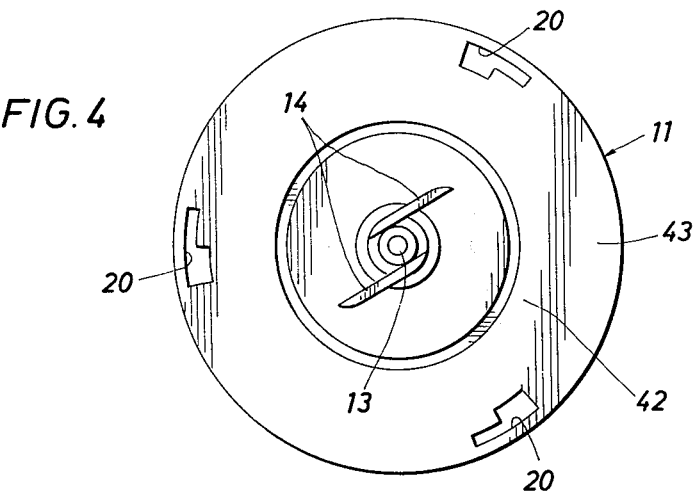
FIG. 4 is a view of the top motor housing of the aerator from the bottom.

FIG. 4 shows the bottom 42 of the motor housing 11 with an outer portion 43 having the eye 20 of the attachment means 18, the shaft 13 of the sealed motor and the blades of the impeller 14. This bottom forms the top of the outer chamber 23 and the top of the inner upper chamber 21 and sealingly separates these two chambers or compartments.

Figure 5:
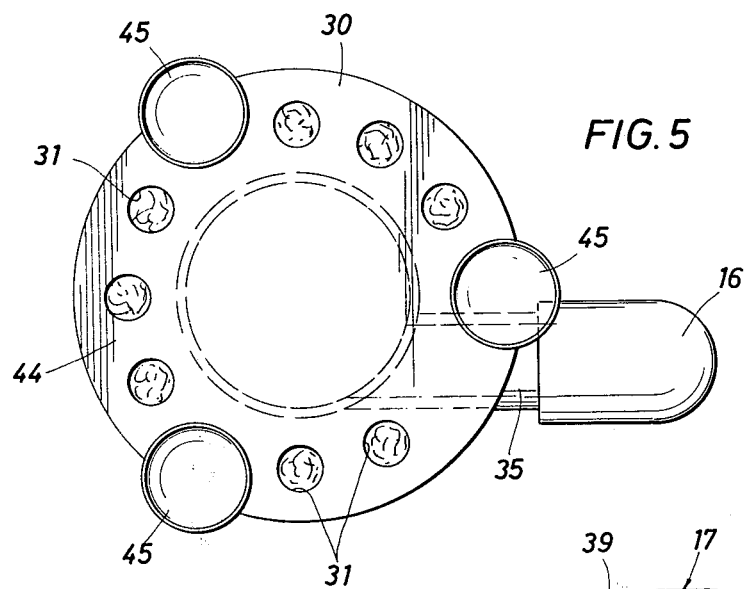
FIG. 5 is a view of the aerator from the bottom.

FIG. 5 shows the bottom 44 of the multi-chambered housing 15 which in this version of the invention forms the bottom of both the outer and the inner lower chamber 22 and 23. The bottom holes 31 which open into the outer chamber 23 are shown. Attached to the bottom 44 are attachment means 45 for attaching the aerator 10 to the bottom of the container 12 into which it is submerged. The preferred type of bottom attachment means 45 is suction cups, preferably rubber.

The length of the delivery conduit 37 is of such a length that it extends between about 21 and about 4.5, preferably between about 18 and about 7 centimeters above the surface of the water into which the aerator 10 is placed. The inner diameter of the conduit is between about 1.5 and about 2.5, preferably about 1.8 centimeters. The overall height of the motor housing 11 and the multi-chambered housing is such that it will be totally submerged within the typical non-commercial bait container; between about 9 and about 14, preferably between about 10 and about 12 centimeters.

The aerator 10 may be made of metal, wood or plastic, but is preferably made of plastic. The preferred plastics are polyvinylchloride, polyethylene, polypropylene, acrylonitrite-butadiene-styrene resins, polystyrene and the polyacrylates. The preferred plastic is polyvinylchloride.

The aerator 10 is attached by the bottom or container attachment means 45 to a container so that the head 17 is approximately in the center of the container and about 9 to about 22 centimeters above the surface of the water. The poles of the motor of the aerator 10 are connected to a battery so that the outside edge of the impeller 14 turns toward the opening 33 in the side 34 of the inner upper chamber 21. Water is drawn into the outer chamber 23 through the side holes 29 and the bottom holes 31 setting up water circulation within the container. The water passes through the filter material 32 and into the inner lower chamber 22 through the side holes 26 and into the inner upper chamber through the passage 25. The water is forced by the rotating impeller 14 into the hole 33 and through the conduits 35 and 37 to the water delivery head 17. Water in the head 17 is forced in a plurality of streams at an angle relative to a line through the center of the delivery conduit 37 of between about 38 degrees and about 42 degrees down onto and below the surface of the water, thereby capturing air containing oxygen as bubbles and sending them at least 6, preferably at least about 7.5 centimeters below the surface, where the circulation set up by the pump helps distribute the oxygen throughout the container.

The preferred number of head side holes 39 per head is between about 5 and about 15, more preferably between about 5 and about 10 and most preferably between 7 and about 9 inclusive.

I claim as my invention:

1. A live bait water aerator comprising:
   (A) a submergible electrically powered water pump;
   (B) a delivery conduit having a delivery entrance hole on one end and a delivery exit hole on the other end with a fluid passage connecting the entrance hole and the exit hole, the delivery conduit attached to the water outlet of the pump so that water can pass from the pump through the delivery entrance hole of the conduit, said conduit extending to a height above the bottom of the pump of between about 20 and about 40 centimeters;
   (C) a water delivery head with a height of between about 5 and about 1.5 centimeters and a cross-section maximum width less than about 5 centimeters and a cross-section minimum width greater than 2 centimeters, the head having an entrance hole in the bottom sealingly attached to the delivery exit hole of the conduit so that water can pass through the conduit into the head, the vertical sides having a plurality of openings evenly spaced over the sides of the head having a diameter of between about 0.25 and about 0.40 centimeters, and a length of between about 0.35 and about 0.55 centimeters, the entrance to the opening being higher than the exit of the opening so that a line through the center of the length of the opening forms an acute angle with a vertical line through the cross sectional center of the opening of between about 30 and about 55 degrees.

2. The aerator of claim 1 where the delivery conduit extends vertically upward to a height of between about 20 and about 30 centimeters above the bottom of the aerator.

3. The aerator of claim 2 where the delivery head is cylindrically shaped with a horizontal diameter of between 2.5 and 3.5 centimeters.

4. The aerator of claim 3 where the number of delivery head openings is between 6 and about 9 inclusive.

5. The aerator of claim 4 where the head openings are in the same horizontal plane.

6. The aerator of claim 5 where the angle made by a line through the center of the length of the head openings and a vertical line through the cross-sectional center of the openings forms an angle of between about 38 and about 40 degrees.

7. The aerator of claim 1 where the height of the delivery conduit is adjustable.

8. The aerator of claim 7 where the delivery conduit is telescopic.

9. A water aerator comprising:
   A. a submergible electrically powered water pump comprising:
      (i) a sealed motor housing having an electrical motor therein with a shaft rotatably connected at one end to the motor and extending from the bottom of the motor housing, the shaft having an impeller on the other end;
      (ii) a three-chambered housing having an inner upper chamber, an inner lower chamber, and an outer chamber surrounding the inner upper and inner lower chambers, the outer chamber having a plurality of outer chamber holes in the sides and bottom of the outer chamber to allow water to flow from outside the aerator to inside the outer chamber, the inner lower chamber having a plurality of inner lower chamber holes to allow water in the outer chamber to flow to the inside of the inner lower chamber and the top of the inner lower chamber forming the bottom of the inner upper chamber and having at least one partition hole to allow water in the inner lower chamber to flow to the inner upper chamber, the inner upper chamber side having a water outlet hole therein, communicating with a water outlet conduit which is attached to the side of the inner upper chamber and passes through the outer chamber and outer chamber side wall to allow water to flow from inside the inner upper chamber to outside the pump, the outlet conduit being attached to the side wall of the inner upper chamber so that a line through the center of the conduit into the inner upper chamber does not pass through the vertical center of the chamber, the bottom of the three-chambered housing having at least one bottom attachment means for attaching the aerator to the surface on which it rests and the top of the three-chambered housing having at least one top attachment means adapted to reversibly attach to the bottom of the motor housing so that the bottom of the motor housing forms the top of the outer chamber and the top of the inner upper chamber and the shaft and impeller of the motor housing extends into the inner upper chamber;
   (B) a filter material placed inside the outer chamber so that substantially all of the water entering the outer chamber through the holes therein must pass through the filter material before entering the inner lower chamber through the holes therein;
   (C) a delivery conduit having a delivery entrance hole and delivery exit hole with a fluid passage connecting the delivery entrance hole and the delivery exit hole, the delivery entrance hole being sealingly connected to the water outlet exit of the pump, the delivery conduit extending vertically upward to a height of between about 20 and about 40 centimeters above the bottom of the aerator;

(D) a water delivery head having a vertical height of between about 1.5 and about 5.0 centimeters and a maximum horizontal cross-section length of less than 5 and a minimum horizontal cross-section length of greater than 2 centimeters, the head having a head entrance hole in the bottom of the head, the delivery conduit being sealingly attached to the head so that the head entrance hole and the delivery conduit exit hole communicate in order that water can flow from the conduit into the head, the sides of the head having a plurality of side holes substantially evenly spaced over the head sides, the side holes having a diameter of between about 0.25 and about 0.40 centimeters and a length of between about 0.35 and about 0.55 centimeters, the inside entrance to the side hole being higher than the outside exit of the side hole so that a line through the center of the length of the side hole forms an angle with a vertical line through the cross-sectional center of the head side hole of between about 30 and about 55 degrees.

10. The aerator of claim 9 where the number of side outer chamber holes is between about 1 and about 20, the number of bottom outer chamber holes is between about 1 and about 12, the number of inner lower chamber holes is between about 2 and about 7 and the number of partition holes is one.

11. The aerator of claim 10 where the number of bottom attachments means is three or greater and the means are suction cups.

12. The aerator of claim 11 where the top attachment means is is a hook and eye.

13. The aerator of claim 12 where the filter material is an open pore non-woven plastic web.

14. The aerator of claim 13 where the plastic web is made of polypropylene.

15. The aerator of claim 14 where the delivery conduit extends to a height of between about 20 to about 30 centimeters above the bottom of the aerator.

16. The aerator of claim 15 where the head is cylindrically shaped with a horizontal diameter of between 2.5 and 3.5 centimeters.

17. The aerator of claim 16 where the number of head side holes is between about 6 and about 9 inclusive.

18. The aerator of claim 17 where the head side holes are all in the same horizontal plane.

19. The aerator of claim 18 where the angle made by a line through the center of the length of the head side hole and a vertical line through the cross-sectional center of the head side hole is between about 38 and about 42 degrees.

20. A process for aerating the water of a live bait container which comprises pumping the water in the container by means of an electrically powered water pump essentially completely submerged in the water of the container through a delivery conduit having a delivery entrance hole on one end and a delivery exit hole on the other end with a fluid passage connecting the entrance hole and the exit hole, the delivery conduit attached to the water outlet of the pump so that water can pass from the pump through the delivery entrance hole of the conduit, said conduit extending to a height above the bottom of the pump of between about 20 and about 40 centimeters and a height above the surface of the water in which the pump is submerged of between about 4.5 and about 20 centimeters, into a water delivery head with a height of between about 5 and about 1.5 centimeters and a cross-section maximum width less than about 5 centimeters and a cross-section minimum width greater than 2 centimeters, the head having an entrance hole in the bottom sealingly attached to the delivery exit hole of the conduit so that water can pass through the conduit into the head, the vertical sides having a plurality of openings evenly spaced over the sides of the head having a diameter of between about 0.25 and about 0.40 centimeters, and a length of between about 0.35 and about 0.55 centimeters, the entrance to the opening being higher than the exit of the opening so that a line through the center of the length of the opening forms an acute angle with a vertical line through the cross-sectional center of the opening of between about 30 and about 55 degrees, then, through the openings in a plurality of streams onto and below the surface of the water of the container, the streams of water contacting the surface of the water at an angle relative to a vertical line through the point of contact essentially equivalent to the angle of the opening, thereby trapping air in the form of bubbles and driving the bubbles below the surface of the water.

21. The process of claim 20 where the height of the delivery conduit is adjustable.

22. The process of claim 21 where the delivery conduit is telescopic.

23. The process of claim 20 where the delivery conduit extends vertically upward to a height of between about 20 and about 30 centimeters above the bottom of the aerator and to a height above the surface of the water of between about 7 and about 18 centimeters.

24. The process of claim 23 where the delivery head is cylindrically shaped with a horizontal diameter of between 2.5 and 3.5 centimeters.

25. The process of claim 24 where the number of delivery head openings is between 6 and about 9 inclusive.

26. The process of claim 25 where the head openings are in the same horizontal plane.

27. The process of claim 26 where the angle made by a line through the center of the length of the head openings and a vertical line through the cross-sectional center of the openings forms an angle of between about 38 and about 40 degrees.

28. A process for aerating the water in a container which comprises pumping the water in the container by means of a submergible electrically powered water pump where the pump comprises:

A. a sealed motor housing having an electrical motor therein with a shaft rotatably connected at one end to the motor and extending from the bottom of the motor housing, the shaft having an impeller on the other end;

B. a three-chambered housing having an inner upper chamber, an inner lower chamber, and an outer chamber surrounding the inner upper and inner lower chambers, the outer chamber having a plurality of outer chamber holes in the sides and bottom of the outer chamber to allow water to flow from outside the aerator to inside the outer chamber, the inner lower chamber having a plurality of inner lower chamber holes to allow water in the outer chamber to flow to the inside of the inner lower chamber and the top of the inner lower chamber forming the bottom of the inner upper chamber and having at least one partition hole to allow water in the inner lower chamber to flow to the inner upper chamber, the inner upper chamber side having a water outlet hole therein, communicating with a water outlet conduit which is attached to the side of the inner upper chamber and passes through the outer chamber and outer chamber side wall to allow water to flow from inside the inner upper chamber to outside the pump, the outlet conduit being attached to the side wall of the inner upper chamber so that a line through the center of the conduit into the inner upper chamber does not pass through the vertical center of the chamber, the bottom of the three-chambered housing having at least one bottom attachment means for attaching the aerator to the surface on which it rests and the top of the three-chambered housing having at least one top attachment means adapted to reversibly attach to the bottom of the motor housing so that the bottom of the motor housing forms the top of the outer chamber and the top of the inner upper chamber and the shaft and impeller of the motor housing extends into the inner upper chamber, said pump having a filter material placed inside the outer chamber so that substantially all of the water entering the outer chamber through the holes therein must pass through the filter material before entering the inner lower chamber through the holes therein into and through a delivery conduit having a delivery entrance hole and delivery exit hole with a fluid passage connecting the delivery entrance hole and the delivery exit hole, the delivery entrance hole being sealingly connected to the water outlet exit of the pump, the delivery conduit extending vertically upward to a height of between about 20 and about 40 centimeters above the bottom of the aerator and to a height above the surface of the water of the container of between about 4.5 and about 20 centimeters, then into a water delivery head having a vertical height of between about 1.5 and about 5.0 centimeters and a maximum horizontal cross-section length of less than 5 and a minimum horizontal cross-section length of greater than 2 centimeters, the head having a head entrance hole in the bottom of the head, the delivery conduit being sealingly attached to the head so that the head entrance hole and the delivery conduit exit hole communicate in order that water can flow from the conduit into the head, the sides of the head having a plurality of side holes substantially evenly spaced over the head sides, the side holes having a diameter of between about 0.25 and about 0.40 centimeter and a length of between about 0.35 and about 0.55 centimeters, the inside entrance to the side hole being higher than the outside exit of the side hole so that a line through the center of the length of the side hole forms an angle with a vertical line through the cross-sectional center of the head side hole of between about 30 and about 55 degrees, then through the openings in a plurality of streams onto and below the surface of the water in the container, the streams of water contacting the surface of water at an angle relative to a vertical line through the point of contact essentially equivalent to the angle of the openings, thereby trapping air in the form of bubbles and driving the bubbles below the surface of the water.

29. The process of claim 28 where the number of side outer chamber holes is between about 1 and about 20, the number of bottom outer chamber holes is between about 1 and about 12, the number of inner lower chamber holes is between about 2 and about 7, the number of partition holes is one, and the conduit height above the surface of the water in the tank is between about 7 and about 18 centimeters.

30. The process of claim 29 where the number of bottom attachment means is three or greater and the means are suction cups.

31. The process of claim 30 where the top attachment means is a hook and eye.

32. The process of claim 31 where the filter material is an open pore non-woven plastic web.

33. The process of claim 32 where the plastic web is made of polypropylene.

34. The process of claim 33 where the delivery conduit extends to a height of between about 20 to about 30 centimeters above the bottom of the aerator.

35. The process of claim 34 where the head is cylindrically shaped with a horizontal diameter of between 2.5 and 3.5 centimeters.

36. The process of claim 35 where the number of head side holes is between about 6 and about 9 inclusive.

37. The process of claim 36 where the head side holes are all in the same horizontal plane.

38. The process of claim 37 where the angle made by a line through the center of the length of the head side hole and a vertical line through the cross-sectional center of the head side hole is between about 38 and about 42 degrees.

* * * * *